US011344981B1

(12) United States Patent
Steinmetz et al.

(10) Patent No.: US 11,344,981 B1
(45) Date of Patent: May 31, 2022

(54) METHOD FOR REMANUFACTURING INTERNAL SPLINE COMPONENTS AND SPLINED CONNECTION

(71) Applicant: Caterpillar Inc., Peoria, IL (US)

(72) Inventors: Andrew D. Steinmetz, Mapleton, IL (US); Chandima Surangie Jayasinghe, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/101,463

(22) Filed: Nov. 23, 2020

(51) Int. Cl.
 *B23P 15/14* (2006.01)
 *F16H 57/08* (2006.01)

(52) U.S. Cl.
 CPC .............. *B23P 15/14* (2013.01); *F16H 57/08* (2013.01)

(58) Field of Classification Search
 CPC .................................. B23P 15/14; F16H 57/08
 See application file for complete search history.

(56) References Cited

U.S. PATENT DOCUMENTS

| 8,501,673 | B2 | 8/2013 | Suzuki et al. |
| 2017/0022614 | A1 | 1/2017 | Herrmann |
| 2018/0017150 | A1* | 1/2018 | Leupold ................. B33Y 10/00 |
| 2018/0257141 | A1* | 9/2018 | Hofmann ........... B23K 15/0086 |
| 2018/0326547 | A1* | 11/2018 | Stadtfeld ................. B23P 15/14 |
| 2018/0340598 | A1* | 11/2018 | Beisner .................... F16H 37/00 |
| 2019/0170236 | A1* | 6/2019 | Kleiss ...................... F16H 55/16 |
| 2020/0023431 | A1* | 1/2020 | Poteet ....................... F04C 2/18 |
| 2020/0180211 | A1* | 6/2020 | Kim ................... B23K 26/0006 |
| 2020/0331103 | A1* | 10/2020 | Lovlund Toft .......... F03D 80/50 |

FOREIGN PATENT DOCUMENTS

| CN | 108085680 A | 5/2018 |
| CN | 108385104 A | 8/2018 |
| CN | 110453218 A | 11/2019 |
| CN | 110387543 B | 6/2021 |

OTHER PUBLICATIONS

Written Opinion and International Search Report for Int'l. Patent Appln. No. PCT/US2021/060033, dated Mar. 9, 2022 (10 pgs).

* cited by examiner

*Primary Examiner* — Rick K Chang
(74) *Attorney, Agent, or Firm* — von Briesen & Roper, s.c.

(57) ABSTRACT

A remanufactured internal spline component includes an inner surface defining a cylindrical bore and a remanufactured internal geometry on the inner surface. The internal geometry has a maximum diameter and a minimum diameter. The remanufactured internal geometry is created by removing a worn internal geometry to a pre-cladding diameter, cladding the inner surface in a plurality of layers by laser cladding to produce a cladded surface, and machining the cladded surface to produce the remanufactured internal geometry.

20 Claims, 7 Drawing Sheets

METHOD FOR REMANUFACTURING INTERNAL SPLINE COMPONENTS AND SPLINED CONNECTION

TECHNICAL FIELD

The present disclosure relates generally to splined components and, more specifically, relates to methods for remanufacturing internal spline components.

BACKGROUND

An electric rope shovel is an electrically powered machine used for digging and loading earth or fragmented rock and for mineral extraction. Unlike more common excavators, the shovel's bucket is moved by a series of cables and winches rather than hydraulics. In order to serve its function, the upper section of the shovel must rotate relative to ground to move excavated material out of the dig site. This rotation requires a substantial swing drive including a number of splined components which transfer energy from a motor to the rotating components.

Splined connections are used to transmit torque from a shaft to a gear hub or other rotating component. External gear teeth on the shaft engage an equal number of internal teeth in the hub. Because multiple teeth engage simultaneously, they can transmit large torques.

Splined components are used in a huge variety of engines, motors, and other systems with rotationally moving parts. In many of these systems, these components suffer considerable wear, but the cost of replacing parts is substantial. In many applications, the bore of the internal spline component is considerably longer than the diameter. In these cases, damage or wear to the internal geometry may be difficult to repair using conventional methods.

Processes exist to repair external spline components, such as that disclosed by U.S. Patent Appl. Publ. No. 2006/0228219A1 to Finton et al. Finton teaches a process to repair an external spline in which additional material is welded to the surface of each tooth of the external spline and then machined into the correct shape. However, this process cannot be applied to internal splines because of the restricted space and risk of overheating the inner surfaces. As such, there remains a need for a method of remanufacturing internal spline components.

SUMMARY OF THE DISCLOSURE

According to one aspect of the present disclosure, a remanufactured internal spline component is disclosed. The remanufactured internal spline component includes an inner surface defining a cylindrical bore and a remanufactured internal geometry on the inner surface. The internal geometry has a maximum diameter and a minimum diameter. The remanufactured internal geometry is created by removing a worn internal geometry to a pre-cladding diameter, cladding the inner surface in a plurality of layers by laser cladding to produce a cladded surface, and machining the cladded surface to produce the remanufactured internal geometry.

According to another aspect of the present disclosure, a method of remanufacturing an internal spline component is disclosed. The method includes providing an internal spline component having an inner surface defining a cylindrical bore, and a worn internal geometry on the inner surface; removing the worn internal geometry to a pre-cladding diameter, cladding the inner surface in a plurality of layers by laser cladding to produce a cladded surface, and machining the cladded surface to produce a remanufactured internal geometry.

According to yet another aspect of the present disclosure, a splined connection is disclosed. The splined connection includes an external spline component and a remanufactured internal spline component. The remanufactured internal spline component includes an inner surface defining a cylindrical bore and a remanufactured internal geometry on the inner surface. The internal geometry has a maximum diameter and a minimum diameter. The remanufactured internal geometry is created by removing a worn internal geometry to a pre-cladding diameter, cladding the inner surface in a plurality of layers by laser cladding to produce a cladded surface, and machining the cladded surface to produce the remanufactured internal geometry.

These and other aspects and features of the present disclosure will be more readily understood after reading the following detailed description in conjunction with the accompanying drawings.

DETAILED DESCRIPTION

Figure 1:
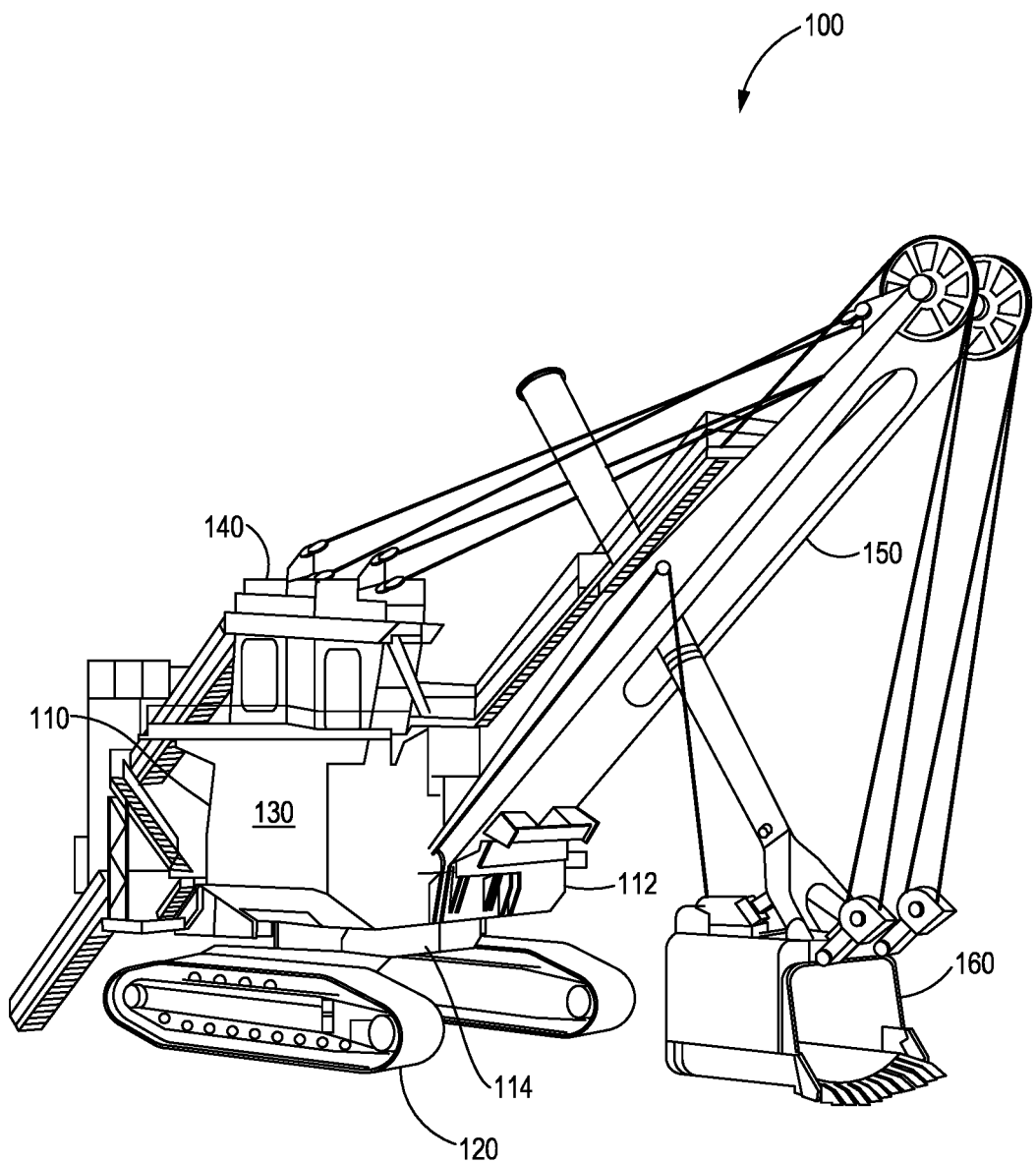
FIG. 1 is a perspective view of an electric rope shovel, according to one aspect of the present disclosure.

Referring now to the drawings, and with specific reference to FIG. 1, an electric rope shovel is depicted and referred to as reference numeral 100. The electric rope shovel 100 is an electrically powered machine used for digging and loading earth or fragmented rock and for mineral extraction. The shovel 100 includes a frame 110 with an upper section 112 and a lower section 114, a track system 120 supporting the frame 110, an engine 130, an operator cabin 140, and a digging arm 150 equipped with a bucket 160 mounted on the frame 110.

Figure 2:
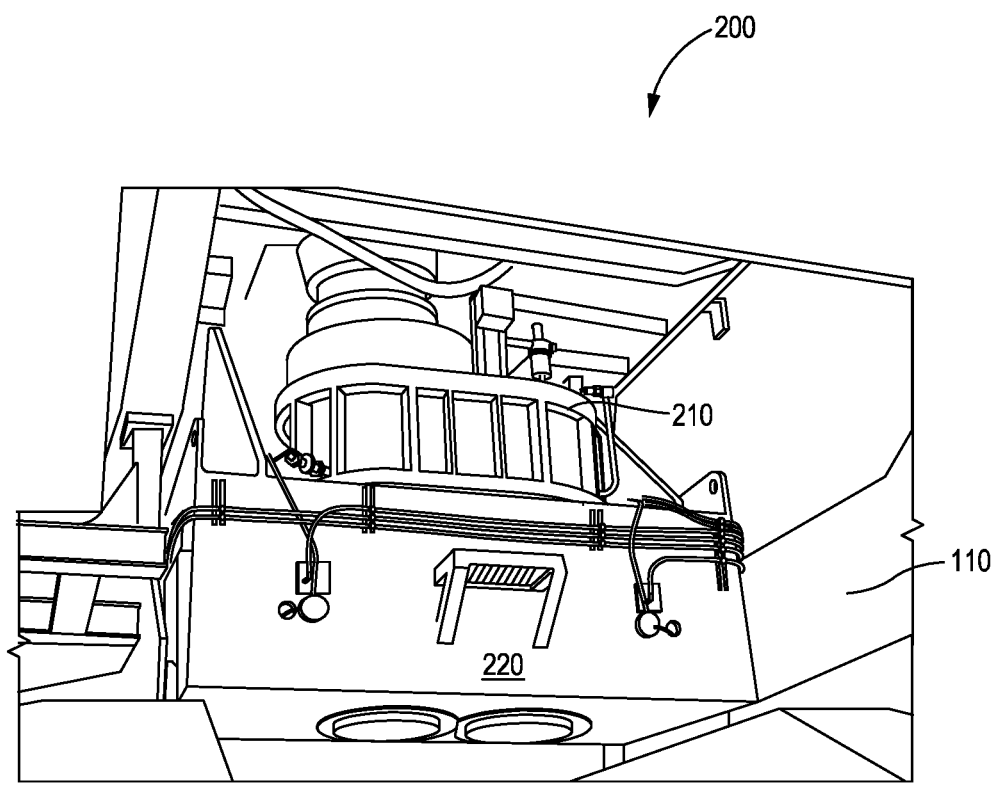
FIG. 2 is a perspective view of a swing drive of the electric rope shovel shown in FIG. 1, according to one aspect of the present disclosure.

The upper section 112 and the lower section 114 of the frame 110 are configured to rotate relative to each other. The rotation is controlled by a swing drive 200, with the lower half shown in FIG. 2 (the upper half is substantially similar and rotated 180 degrees vertically). The swing drive 200 includes two planetary gearboxes 210, each driven by a motor 220 and located on each section of the frame 110. These gearboxes 210 drive a swing rack (not shown) and cause the upper section 114 to rotate.

Figure 3:
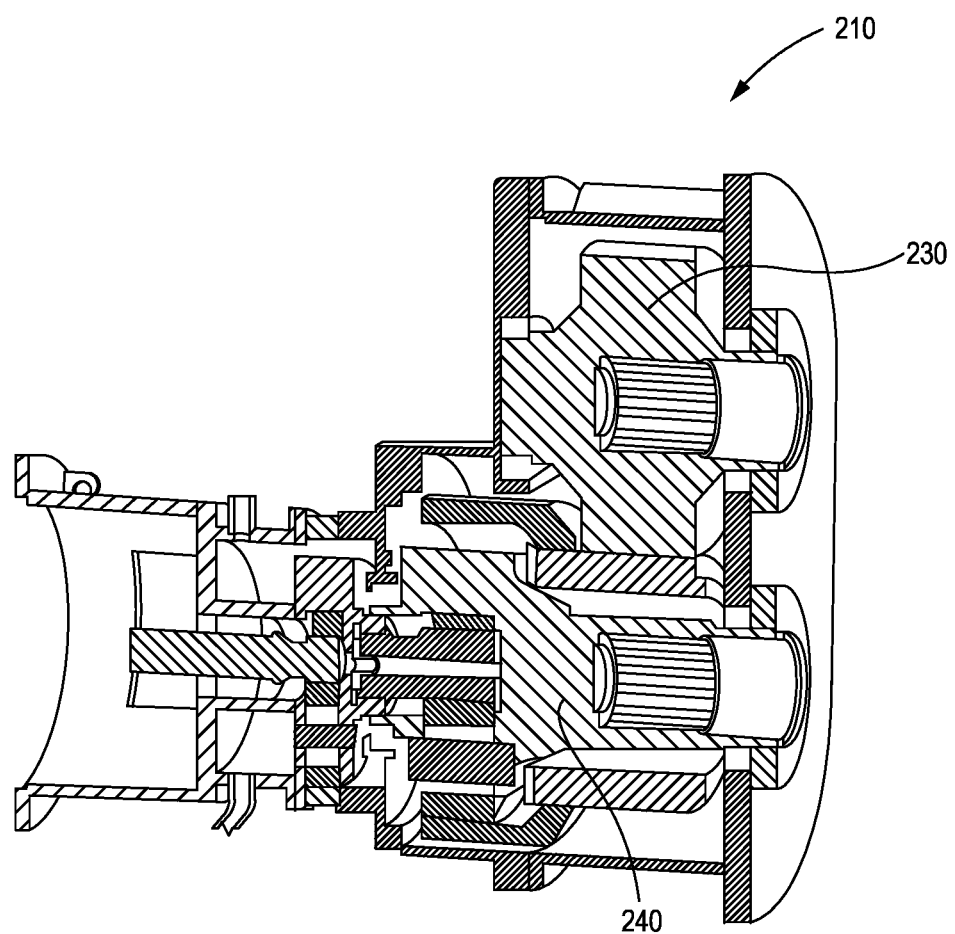
FIG. 3 is cross-section of a planetary gearbox of the swing drive shown in FIG. 2, according to one aspect of the present disclosure.

As shown in cross-section in FIG. 3, the planetary gearbox 210 includes among other components, a planet carrier gear 230, and an output gear 240 which contribute to transferring energy from the motor 220 to a shaft (not shown) driving the swing rack (not shown). Both the planetary carrier 230 and the output gear 240 include an internal spline component and serve as half of a splined connection.

Figure 4:
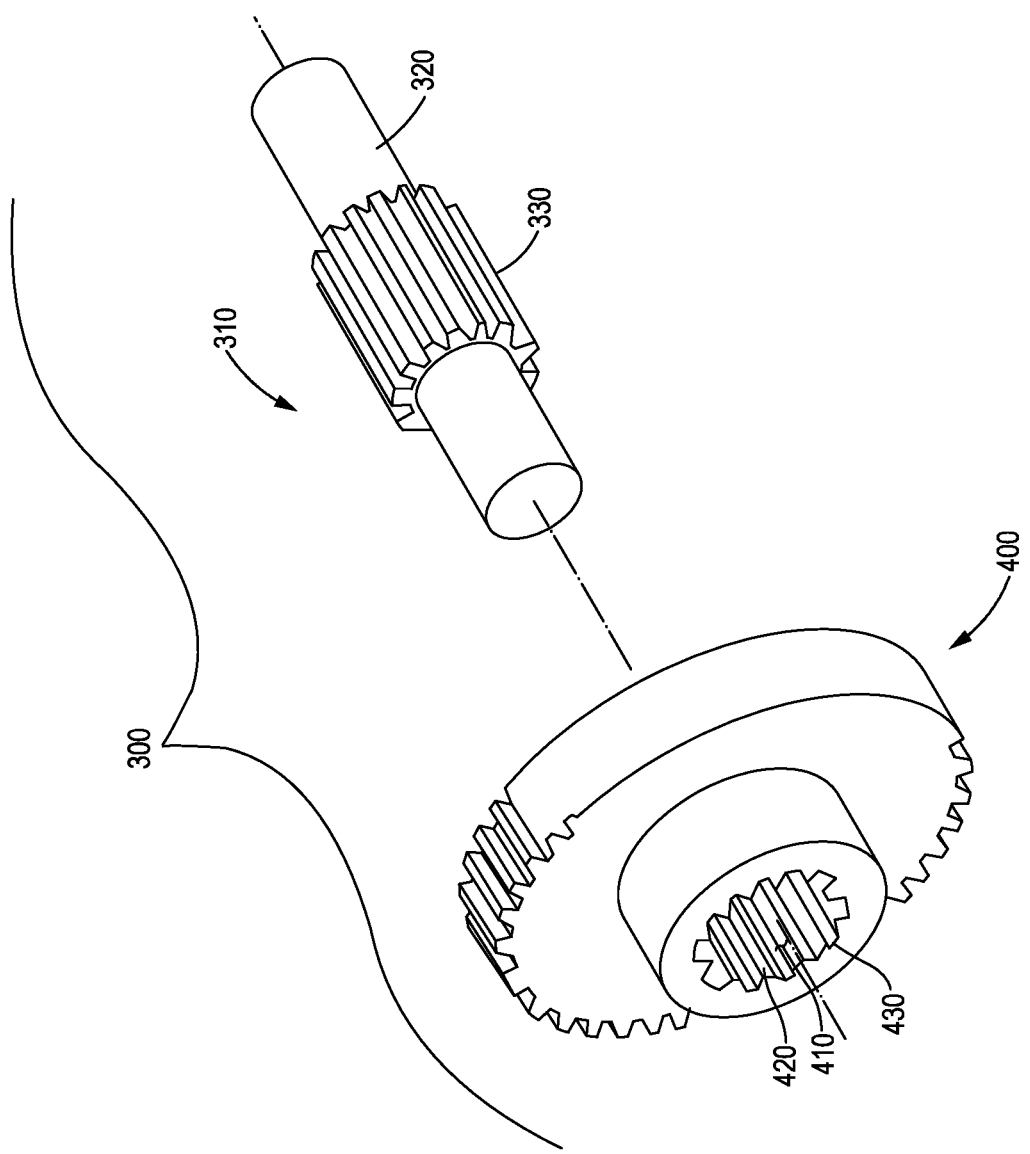
FIG. 4 is a perspective view of a splined connection, according to one aspect of the present disclosure.
Figure 5:
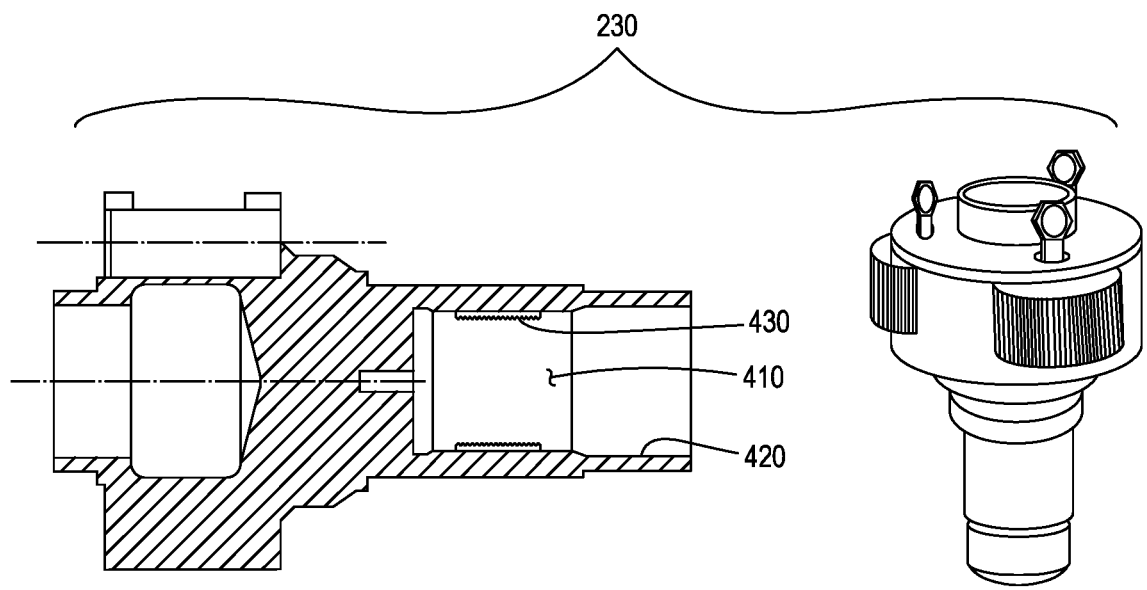
FIG. 5 is a perspective view and cross section of a planet carrier gear of the planetary gearbox shown in FIG. 3, according to one aspect of the present disclosure.
Figure 6:
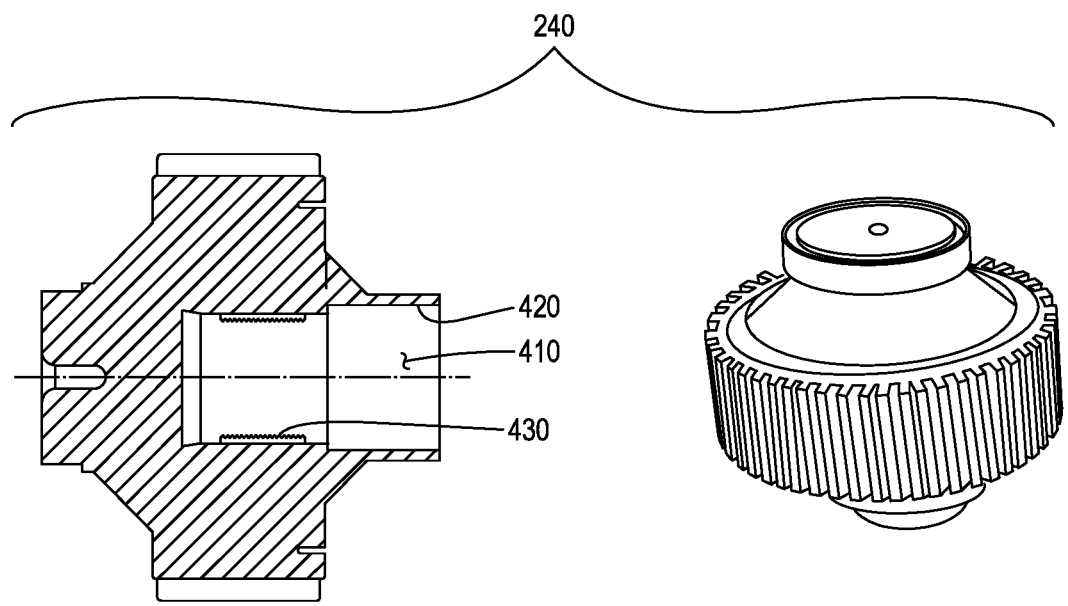
FIG. 6 is a perspective view and cross section of an output gear of the planetary gearbox shown in FIG. 3, according to one aspect of the present disclosure.

An exemplary splined connection 300 is depicted in FIG. 4. Splined connections 300 include two parts, an external spline component 310 and an internal spline component 400. The external spline component 310 may be part of a cylindrical shaft 320 and has an external geometry 330 around at least some portion of an outer surface 340. The internal spline component 400 has an internal bore 410 configured to fit the external spline component 310 therein. The internal bore 410 is roughly cylindrical and defined by an inner surface 420. At least some portion of the inner surface 420 has an internal geometry 430. The internal geometry 430 is configured to mesh with the external geometry 330 of the corresponding external spline component 310. The specific embodiments of the planetary carrier 230 and output gear 240 of the planetary gearbox 210 are depicted in FIGS. 5 and 6 respectively.

Figure 7:
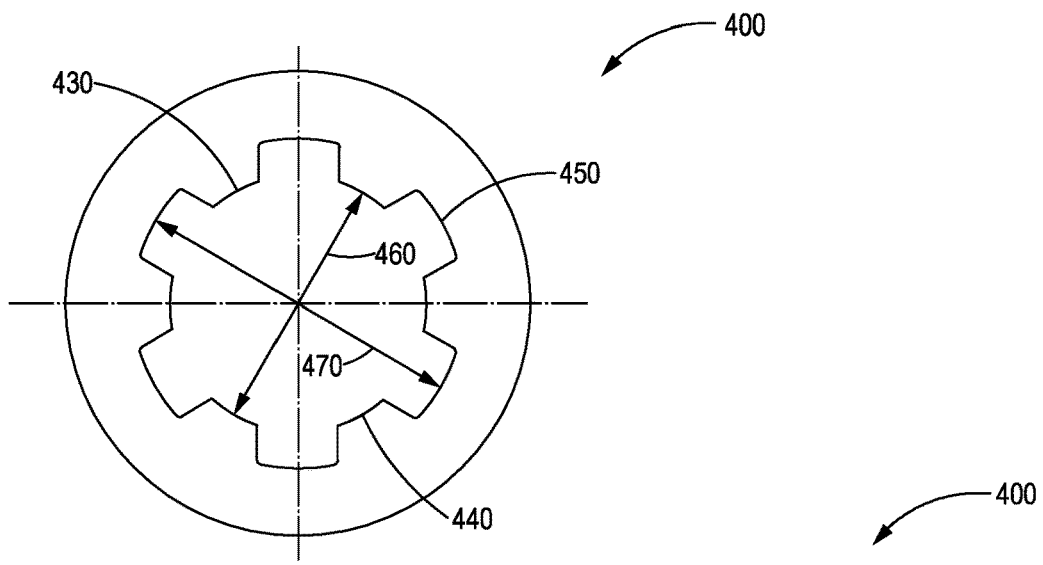
FIG. 7 is a cross-section view of an internal spline component, according to one aspect of the present disclosure.

A stylized cross section of an internal spline component 400 is shown in FIG. 7. The internal geometry 430 may include a plurality of teeth 440 and grooves 450 running parallel to a longitudinal axis of the bore 410. The teeth 440 and grooves 450 are configured to mesh with corresponding teeth and grooves on the external spline component 330. The teeth 440 extend radially inward towards the center of the bore 410. The teeth 440 may be any shape known in the art, including straight and involute. The grooves 450 extend radially outward away from the center of the bore 410. A minimum diameter 460 may be measured from the centermost point of the tooth 440 and a maximum diameter 470 may be measured from the outermost point of the groove 450. In other embodiments, teeth 440 and grooves 450 may spiral around the inner surface 420, contain flat sections for alignment, or other geometries known in the art.

In the specific embodiment of the output gear 240, the bore 410 may be 16 inches deep with a maximum diameter of 9 inches. The internal geometry may extend for 8 inches. The teeth 440 may have a total height of 3/8 inch creating a minimum diameter 460 of 8.25 inches.

During use, internal spline components 400 are subject to substantial stresses. This can result in a worn internal geometry 430, particularly damage to the edges of the teeth 440. When the wear is severe enough, the component 400 can no longer function and may cause the gearbox 210 to fail or operate. Although methods are known to repair external spline components 310, damage or wear to the internal geometry 430 may be difficult to repair using conventional methods. The difficulty results in part because the bore 410 of the internal spline component 400 is often considerably longer than the diameter, making access challenging. Furthermore, repairing the internal spline components 400 requires adding additional material. Most methods of adding material, such as welding, require substantial heat, which can overheat the inner surface 420. In a component 400 with a deep bore 410, it can be difficult to dissipate heat at the needed rates.

However, internal spline components 400 can be repaired through a process of laser-cladding re-manufacturing. The process includes three main aspects: removing a worn internal geometry 430, cladding, and machining a remanufactured internal geometry 430.

Figure 8:
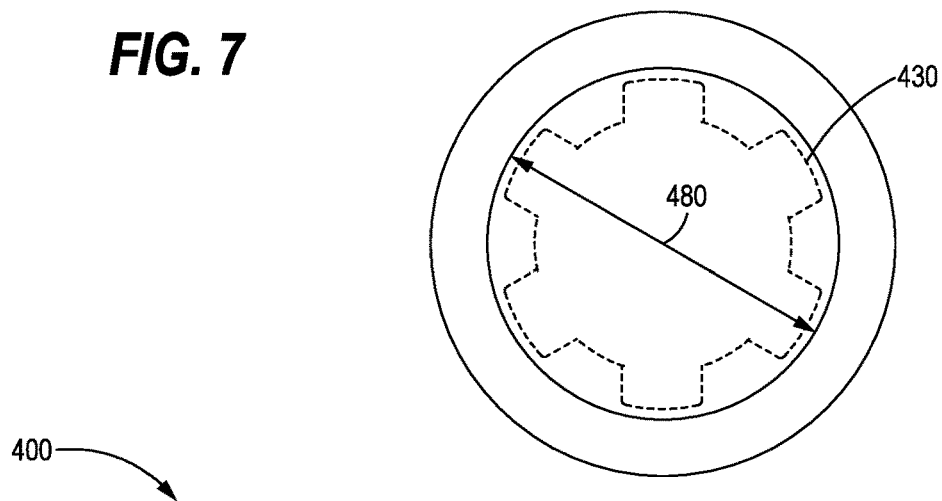
FIG. 8 is a cross-section view of an internal spline component, according to one aspect of the present disclosure.

Removing the worn internal geometry 430 requires machining the inner surface 420 until the worn internal geometry 430 is gone and a generally smooth surface suitable for subsequent laser cladding is produced. Any method known in the art may be used for this step, including but not limited to broaching, cutting, and milling. This process should remove all material at least to the maximum diameter 470 of the internal geometry 430. Preferably, the inner surface 420 should be removed to a pre-cladding diameter 480 greater than the maximum diameter 470 of the internal geometry 430, as shown in FIG. 8. FIG. 8 also depicts the internal geometry as a dotted line. This allows for all material which may contain hidden micro-cracks and fatigue to be removed. Furthermore, removing to a depth below the internal geometry allows for any stresses created at the bonding point between the original material and the cladding material to be buried within the component and not in an area subject to further stresses. In some cases, a typical example of a worn component may be analyzed to determine the typical depth of potentially damaged material and set the pre-cladding diameter 480 accordingly.

In the specific embodiment of the output gear spline component 240, the entirety of the teeth 440 past the bottom of the grooves 450 may be removed. The pre-cladding diameter 480 may be 3 mm greater than the maximum diameter 470 of the internal geometry 430.

Once the substrate is prepared, new material is built up on the inner surface 420 by laser cladding to produce a cladded surface 490 with a post-cladding diameter 500. The cladded surface 490 will be generally even without internal geometry. Laser cladding is a method of adding material to a surface by melting a feedstock with a laser and bonding that melted material to the surface. The feedstock may be in either a powder or wire form. The laser cladding is performed by a cladding head (not shown) which directs a laser and the feedstock material to meet at the cladding surface 490. In cases with a deep bore like the planet carrier 230 and output gear 240, the bore 410 requires a cladding head configured to function within the constrained space. In some embodiments, the cladding head may be configured to deflect the laser at an angle.

The material chosen for cladding should be selected to bond well with the inner surface 420 of the internal spline component 400 while maintaining the same material properties. In particular, the material should have the same hardness so that it does not wear too quickly or cause too much damage to the external spline component 310. The material must furthermore have similar patterns of stress, wear and fatigue so that a weak spot does not form at the boundary. Finally, the porosity of the material must be low to ensure complete bonding with the inner surface 430.

Figure 9:
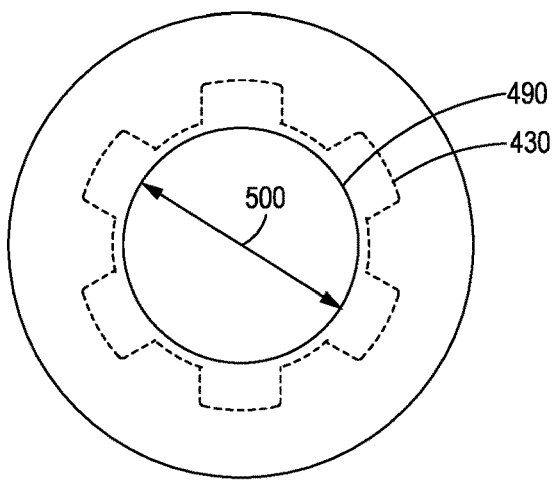
FIG. 9 is a cross-section view of an internal spline component, according to one aspect of the present disclosure.

The cladding material may be added in a plurality of layers until the post-cladding diameter 500 is reached. The post-cladding diameter 500 must be greater than the minimum diameter 460 of the internal geometry 430 to allow for machining, as shown in FIG. 9. FIG. 9 also depicts the internal geometry as a dotted line. The layers may be 1-2 mm thick each. In some embodiments, 6-7 layers may be required, although any number of layers may be used as needed. Using a plurality of layers may aid in avoiding overheating of the inner surface 420 and result in a more consistent surface for subsequent steps.

Finally, the cladded surface 490 is machined to produce a remanufactured internal geometry 430. This step may be done by any method suitable for the purpose, including, but not limited to, broaching, cutting, and milling.

INDUSTRIAL APPLICABILITY

Splined components are used in a huge variety of engines, motors, and other systems with rotationally moving parts. In many of these systems, these components suffer considerable wear, but the cost of replacing parts is substantial. As such, the method of remanufacturing internal splines according to the present disclosure may be of use for components in many applications, including mining and construction equipment, agricultural machinery, vehicles, and any system in which splined connections in gearboxes are subject to substantial wear.

Figure 10:
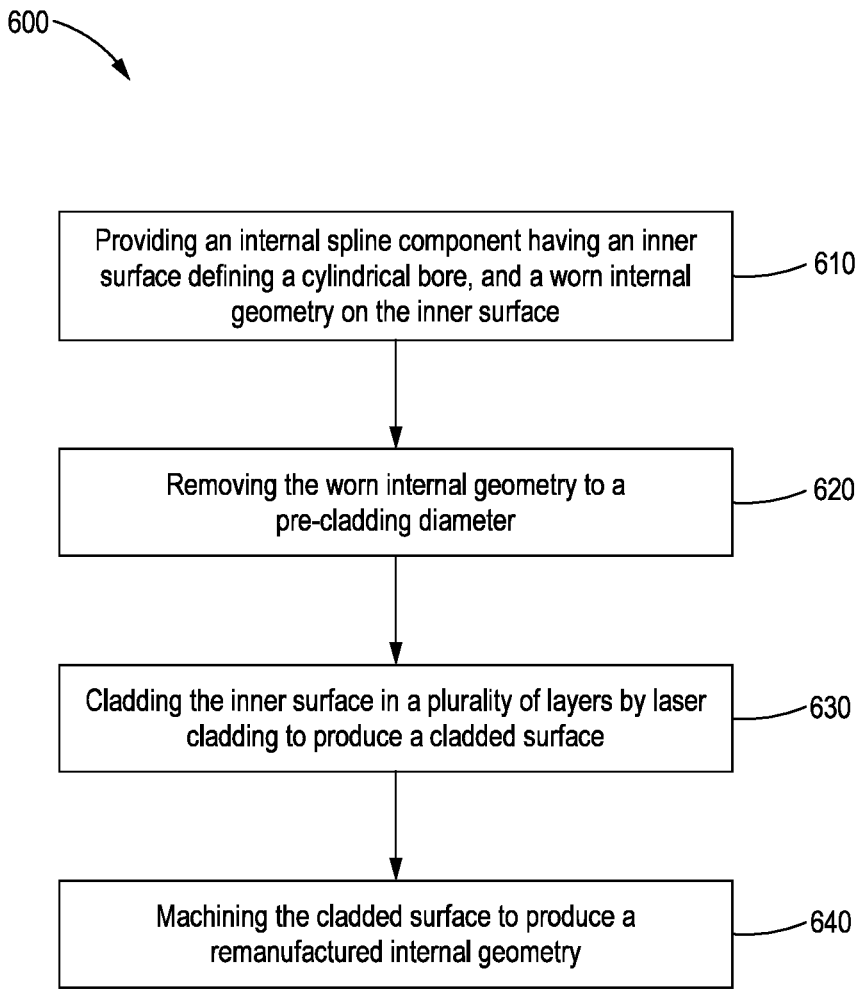
FIG. 10 is a flow chart of a method of remanufacturing an internal spline component, according to one aspect of the present disclosure.

The re-manufacturing method 600 includes four steps, as shown in FIG. 10. First, as shown in block 610, an internal spline component 400 with worn internal geometry 430 on the inner surface 420 of a cylindrical bore 420 is provided. Next, the worn internal geometry 430 must be removed (block 620). Removing the worn internal geometry 430 requires machining the inner surface 420 to provide a suitable surface for laser cladding. This process should remove all material at least to the maximum diameter 470 of the internal geometry 430. Preferably, the inner surface 420 should be machined to a pre-cladding diameter 480 greater than the maximum diameter 470 of the internal geometry 430. This allows for material which may contain hidden micro-cracks and fatigue to be removed. Any method known in the art may be used for this step.

Next, as shown in block 630, cladding material may be added to the inner surface 420 in a plurality of layers to produce a cladded surface 490 until a post-cladding diameter 500 is reached. The post-cladding diameter 500 must be greater than the minimum diameter 460 of the internal geometry 430 to allow for machining. The layers may be 1-2 mm thick each. In some embodiments, 6-7 layers may be required, although any number of layers may be used as needed. Using a plurality of layers may aid in avoiding overheating of the inner surface 410 and result in a more consistent cladding surface 490 for the subsequent step.

Finally, the remanufactured internal geometry 430 of the internal spline component 400 is produced by any suitable method of machining the cladded surface 490, as shown in block 640.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A remanufactured internal spline component, comprising:
    an inner surface defining a cylindrical bore; and
    a remanufactured internal geometry on the inner surface having a maximum diameter and a minimum diameter, the remanufactured internal geometry created by:
        removing a worn internal geometry to a pre-cladding diameter,
        cladding the inner surface in a plurality of layers by laser cladding to produce a cladded surface, and
        machining the cladded surface to produce the remanufactured internal geometry.

2. The internal spline component of claim 1, wherein the pre-cladding diameter is larger than the maximum diameter of the internal geometry.

3. The internal spline component of claim 1, wherein the internal geometry includes a plurality of teeth and grooves.

4. The internal spline component of claim 1, wherein the cladded surface has a post-cladding diameter smaller than the minimum diameter of the internal geometry.

5. The internal spline component of claim 1, wherein the cylindrical bore has a length greater than a diameter.

6. The internal spline component of claim 1, wherein the internal spline component is a planetary gear.

7. The internal spline component of claim 1, wherein the internal spline component is an output gear.

8. A method of remanufacturing an internal spline component, the method comprising:
    providing an internal spline component having an inner surface defining a cylindrical bore, and a worn internal geometry on the inner surface;
    removing the worn internal geometry to a pre-cladding diameter,
    cladding the inner surface in a plurality of layers by laser cladding to produce a cladded surface, and
    machining the cladded surface to produce a remanufactured internal geometry.

9. The method of claim 8, wherein the internal geometry has a maximum diameter and a minimum diameter.

10. The method of claim 9, wherein the pre-cladding diameter is larger than the maximum diameter of the internal geometry.

11. The method of claim 9, wherein the cladded surface has a post-cladding diameter smaller than the minimum diameter of the internal geometry.

12. The method of claim 8, wherein the cylindrical bore has a length greater than a diameter.

13. The method of claim 8, wherein the internal spline component is a planetary gear.

14. The method of claim 8, wherein the internal spline component is an output gear.

15. A splined connection comprising:
    an external spline component having an external geometry; and
    a remanufactured internal spline component having:
        an inner surface defining a cylindrical bore configured to fit the external spline within, and
        a remanufactured internal geometry on the inner surface having a maximum diameter and a minimum diameter, the remanufactured internal geometry created by:
            removing a worn internal geometry to a pre-cladding diameter,
            cladding the inner surface in a plurality of layers by laser cladding to produce a cladded surface, and
            machining the cladded surface to produce the remanufactured internal geometry.

16. The splined connection of claim 15, wherein the pre-cladding diameter is larger than the maximum diameter of the internal geometry.

17. The splined connection of claim 15, wherein the internal geometry includes a plurality of teeth and grooves.

18. The splined connection of claim 15, wherein the cladded surface has a post-cladding diameter smaller than the minimum diameter of the internal geometry.

19. The splined connection of claim 15, wherein the internal spline component is a planetary gear.

20. The splined connection of claim 15, wherein the internal spline component is an output gear.

\* \* \* \* \*